2,297,261

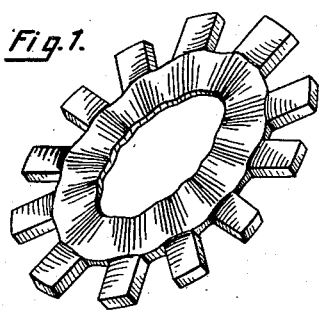
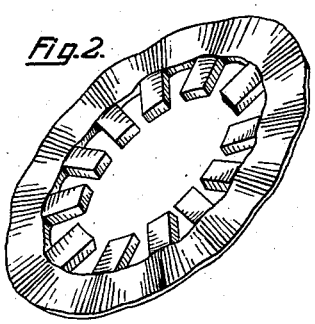
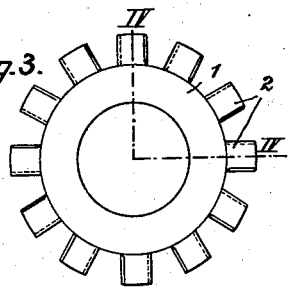
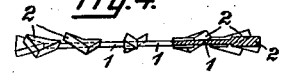
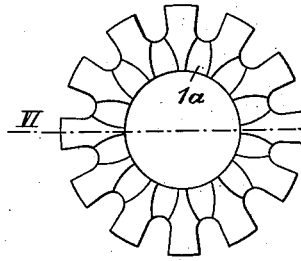
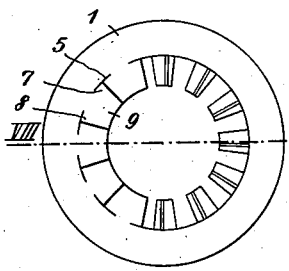
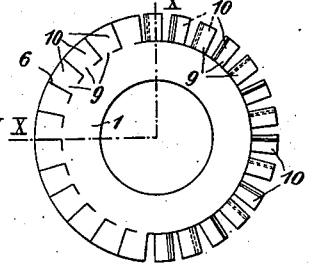
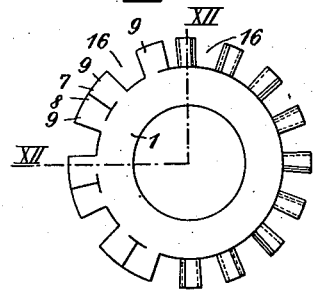
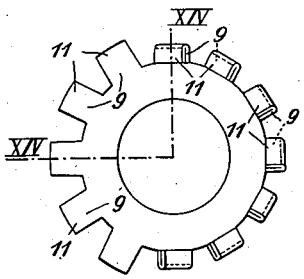
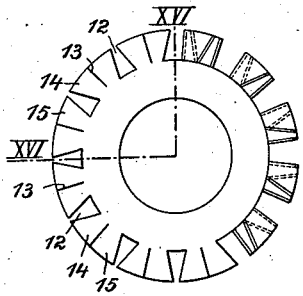
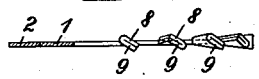
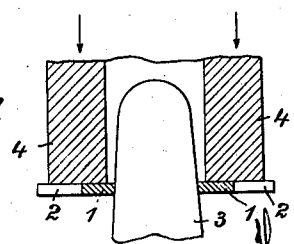
Inventor:
Adolf Thode, Patented Sept. 29, 1942

UNITED STATES PATENT OFFICE 2,297,261

NUT LOCKING DEVICE

Adolf Thode, Ihlsee, near Bad Segeberg, Germany; vested in the Alien Property Custodian Application July 27, 1938, Serial No. 221,494
In Germany August 3, 1937

10 Claims. (Cl. 151—35)

This invention relates to a nut locking device in the form of a washer which consists of a continuous ring-shaped body and teeth radially extending outwards or inwards therefrom and twisted (side set) relative to the plane body. In the known nut locking devices of this type the ring-shaped body is of the same thickness as the teeth throughout perpendicularly to the plane of the washer, consequently, when the nut to be locked is screwed home tightly, the side set teeth are therefore pressed flat. Thus, the teeth are subjected to torsion-stressing. If this stressing continues for a relatively long time the intrinsic resiliency of the teeth slackens and the teeth have no longer sufficient tendency to return into their initial position. Therefore, the known nut locking devices of this type, even after having been used once, are unsuitable for further use after the nut has been unscrewed.

The object of the invention is, to avoid this overstressing. This problem is solved in that the yield in the nut locking device is lengthened. This is attained in that the continuous ring-shaped body is not so thick in the washer plane than the teeth themselves. Thus, an air gap always remains between the ring-shaped body and the nut or nut seat, even when the nut is screwed home tight. The pressing flat of the teeth can therefore only have the effect upon the ring-shaped body that this body bends in undulated shape under the torsional pressure of the teeth. Figs. 1 and 2 show this undulated bending of the ring-shaped body for washers with external and internal teeth when these teeth are pressed quite flat. By this construction of the nut locking device the torsional stressing of the teeth is consequently converted into a bending stressing of the continuous washer body. By the correct selection of the thickness proportion between the teeth and the supporting ring the twisting of the teeth always remains within the limit of elasticity so that the resiliency is permanently assured.

The difference in thickness between the ring-shaped body and the teeth may be attained either by reducing the thickness of the ring-shaped body or by increasing the effective thickness of the teeth. For this purpose the ring-shaped body, for example, may be stretched by drawing or pressing, or the teeth, after the sheet metal plate has been suitably incised, are increased in thickness by folding or overlapping.

Several embodiments of the invention are illustrated by way of example in the accompanying drawing, in which:

Figs. 1 and 2 are perspective views showing the undulations of the ring shaped bodies of two different lock washers when the teeth are in flat condition as when pressed flat between a nut and a support, Fig. 3 shows in plan view a washer with teeth on the outer edge with thinner ring-shaped body, Fig. 4 is a section on line IV—IV of Fig. 3, Figs. 5 and 6 show a similar washer with only partly thinner ring-shaped body, Fig. 7 is a plan view of a washer with teeth on the inner edge and T-shaped incisions forming edge flaps which are folded over onto the teeth, Fig. 8 is a section on line VIII—VIII of Fig. 7, Fig. 9 shows in plan view a washer with teeth on the outer edge and which have L-shaped incisions and folded over edge flaps on the teeth, Fig. 10 is a section on line X—X of Fig. 9, Fig. 11 shows in plan view a washer with teeth on the outer edge, T-shaped incisions and folded over edge flaps, Fig. 12 is a section on line XII—XII of Fig. 11, Fig. 13 is a plan view of an externally toothed washer with punched out extended teeth and tooth ends folded over alternately upwards and downwards, Fig. 14 is a section on line XIV—XIV of Fig. 13, Fig. 15 shows in plan view a washer with outwardly directed teeth overlapping in pairs, Fig. 16 is a section on line XVI—XVI of Fig. 15, Fig. 17 shows a washer according to Figs. 1 and 2 with a device for widening the ring-shaped carrier by means of a conical mandrel and hollow die.

In all the plan views of the forms of construction of the washer illustrated in Figs. 5, 7, 9, 11, 13, 15 the left half shows the washer after the incising and punching and the ring half shows the washer with the finished shaped teeth.

In Figs. 3 and 4 the continuous ring-shaped body is designated by 1 and the toothed portion of the washer by 2. The ring-shaped body 1 has been stretched relatively to the toothed portion, by pressing, expanding, stretching or the like, to such an extent that its cross-section perpendicularly to the bearing surface of the washer is thinner than the toothed portion 2.

According to Figs. 5 and 6 only the portions 1a of the continuous ring-shaped body 1 between the teeth are made thinner. This may be effected for example by stamping or the like.

According to Figs. 7 and 8 T-shaped incisions 5 are made in the toothed portion 2 whose arms extending transversely to the radial direction are located between the ring-shaped body 1 and the serrated portion 2. The projecting flaps 7 and 8 of the teeth 9 one on each side of the T-shaped incisions are folded over alternately upwards and downwards on to the tooth portion 9 remaining connected with the ring-shaped body, so that the teeth are made twice the thickness of the ring-shaped body and have sharp edges at the points of contact with the bearing surfaces of the washer.

In Figs. 9 and 10 the toothed portion 2 has L-shaped incisions 6 whose base cut lies between the ring-shaped body 1 and the toothed portion 2. The flaps 10 thereby projecting laterally from each tooth 9 are folded over alternately upwards and downwards on to the tooth portion connected with the ring-shaped body, so that the teeth 9, 10 are twice the thickness of the ring-shaped body and the teeth have alternately oppositely directed oblique positions and alternately upwardly and downwardly directed sharp edges at their points of contact with the bearing surfaces of the washer.

In Figs. 11 and 12 alternately T-shaped incisions 5 and punched out holes 16 are made in the toothed portion of the punched washer. The flaps 7, 8 thus produced are folded over alternately upwards and downwards on to the tooth portions remaining attached to the ring-shaped body 1, so that the teeth, while assuming the same oblique position, have alternately upwardly and downwardly directed sharp edges at the points of contact with the bearing surfaces of the washer. The punched holes 16 ensure a uniform spacing of the individual teeth. These holes may, however, be omitted in which cases the spacing of the teeth 9 is irregular.

In Figs. 13 and 14 the punched teeth have specially long teeth, so that their outer ends can be folded over as flaps 11 on to the tooth portions 9 connected with the ring-shaped body 1. It may be advantageous for the tooth ends 11 to be folded over in upward and downward directions.

In Figs. 15 and 16 triangular or trapezoidal apertures and radial incisions 13 are alternately cut in the toothed portion 2 so that pairs of teeth 14 and 15 are produced side by side. These teeth 14 and 15, after being side set, are bent tangentially in the washer plane so that they overlap in pairs, and in the finished washer the toothed portion perpendicularly to the bearing surfaces of the washer is at least twice as thick as the ring-shaped body 1.

The different constructions of the toothed washer are produced by punching the discs from band material for example steel in the shape shown on the left halves of Figs. 3, 5, 7, 9, 11, 13 and 15 and then by shaping the toothed portion, or the ring-shaped body or both portions so that the ring-shaped body 1 is of thinner cross-section than the toothed portion 2, and at the same time the side setting of the individual teeth may be effected either before or after the shaping of the ring-shaped body or the toothed portion. In the event of the ring-shaped body being shaped by stretching or stamping or widening over a conical mandrel, the setting of the teeth is preferably carried out after this operation by means of suitable dies and matrices. When the toothed portion 2 of the washer is shaped by cutting T-shaped or L-shaped incisions or by punching holes, the punching out of the washer and the production of the incisions are preferably performed at the same time, whereas the flaps produced by the incisions are folded over on to the teeth and the teeth subsequently set.

If the toothed portion is shaped by punching out long teeth and bending over the ends of these teeth, the washer with the long teeth is punched in the first operation, the ends of the teeth then folded over in upward or downward direction or alternately in upward and downward directions, and the teeth are side set in the third operation.

When the toothed portion 2 is shaped by punching radial incisions and triangular, trapezoidal or other shaped holes widening towards the ring-shaped body 1 (Figs. 15, 16), the incisions and holes are punched at the same time as the disc. The teeth are then set and bent towards one another in the plane of the washer so that two neighbouring teeth overlap.

Under certain circumstances it may be advisable for the ring-shaped body which, when the nut is tightened, is to bend in undulated shape, to be slightly undulated during the manufacturing process.

The nut locking devices may be constructed for bolts and nuts with level or conical bearing surfaces. In the latter instance the washer is of corresponding conical shape. The flaps which are produced by the T- or L-shaped incisions may be folded over the entire width of the teeth or over a portion thereof. The folding over of the edge flaps of the teeth can be effected towards the same side or alternately upwards and downwards, according to whether the tooth is to be twice or three times as thick as the ring-shaped body. It is advisable to fold over these edge flaps so as to produce a large number of sharp edges on the tooth at their points of contact with the bearing surfaces of the washer.

I claim:

1. A lock washer comprising, in combination, a ring-shaped body; and teeth integrally joining the body and having lateral biting portions; each tooth comprising a part integral with the body and a portion separated from the body and integral with said part and folded flat upon said part to make a double thickness tooth stiffer than said ring shaped body; said part and portion being inclined so that the plane of the tooth as a whole is inclined to the plane of the body.

2. A lock washer comprising an inherently flat ring-shaped body; and teeth projecting from and integrally joining an edge of the body and having approximately radial engagement edges respectively engageable with opposed nut and nut-seat parts; the teeth being normally so inclined that the planes of the teeth are inclined to the plane of the body with engagement edges on both sides of said plane of the body; at least one engagement edge of each tooth being a biting edge, there being biting edges on both sides of said plane of the body; said ring body being resiliently bendable and when bent tending strongly to return to its flat shape; each tooth as a whole being out of contact with other teeth and stiffer against torsional strain and thicker than the ring body; each tooth at inclined angles being out of contact with said parts between said engagement edges and a vertical plane perpendicular to the plane of the ring body and including the axis of the tooth; the outer ends of the engagement edges of each tooth being relative to the elasticity and strength of the ring shaped body far enough apart and far enough from said vertical plane to cause the usual pressure of a nut closing on the washer to provide enough torque to overcome the resistance of, and bend, the ring body at the tooth and render yieldable and non-rigid each tooth and the locking effect of said biting edges at all inclined angles of the tooth.

3. In a washer as in claim 2, said torque being sufficient to gradually change the tooth from its normal inclination until the tooth substantially flattens out and the medial plane of the tooth assumes a position substantially in the medial plane of the ring body, and causes the portion of the body adjacent to each tooth root to be depressed on one side of the tooth root and raised at the other side and to be changed in inclination from normal flat condition; the depressed and raised portions strongly tending to assume the inherently flat condition of the body thus to strongly hold said biting edges in strong biting engagement with said parts should the latter move apart.

4. In a washer as in claim 2, the inclination of the tooth relative to its width between said engagement edges, and the limit of elasticity of the ring body being such that the bending of the ring body at each tooth will be within the limits of its elasticity of the body.

5. In a washer as in claim 2, the distance between the top and bottom planes of said teeth when flattened, being enough greater than the normal thickness of the ring body, to provide sufficient space in which said ring body at the sides of the tooth root may be freely raised and depressed respectively.

6. In a washer as in claim 2, each tooth consisting of only a single thickness of the material.

7. A lock washer comprising an inherently flat ring-shaped body; and inclined teeth projecting from and integrally joining an edge of the body, said teeth having approximately radial engagement biting edges respectively engagable with opposed nut and nut-seat parts; said ring body being resiliently bendable and when bent tending strongly to return to its flat shape; each tooth as a whole being always out of contact with other teeth and stiffer against tortional strain than the ring body; the outer ends of the engagement edges of each tooth being, relative to the elasticity and strength of the ring shaped body, far enough apart and far enough from a plane perpendicular to the body and including the axis of the tooth to cause the usual pressure of a nut closing on the washer to provide enough torque to overcome the resistance of, and bend, the ring body at the tooth and render yieldable and non-rigid each tooth and a yieldable locking effect of said biting edges at all inclined angles of the tooth.

8. In a washer as in claim 7, each tooth being at all inclined angles free of engagement with said opposed parts between the engagement edges.

9. A lock washer comprising an inherently flat ring-shaped body; and inclined sections projecting from and integrally joining an edge of the body, adjacent sections being displaced to overlap and form distinct inclined composite teeth thicker than the body and each having approximately radial engagement biting edges respectively engagable with opposed nut and nut-seat parts; said body being resiliently bendable and when bent tending strongly to return to its flat shape; each composite tooth as a whole being always out of contact with other teeth and stiffer against tortional strain than the ring body; the outer ends of the inner biting engagement edges nearest the radial axis of each tooth being, relative to the elasticity and strength of the ring shaped body, far enough apart and far enough from a plane perpendicular to the body and including the axis of the tooth to cause the usual pressure of a nut closing on the washer to provide enough torque to overcome the resistance of, and bend, the ring body at the tooth and render yieldable and non-rigid each tooth and a yieldable locking effect of said biting edges at all inclined angles of the tooth.

10. In a washer as in claim 9, said torque being sufficient to force each composite tooth as a whole to yield and gradually change the tooth from its normal inclination until the tooth substantially flattens out and until the medial plane of the composite tooth assumes a position substantially in the medial plane of the ring body, thus retracting the outermost edges from said opposed parts, and causes the portion of the body adjacent to each tooth root to be depressed on one side of the tooth root and raised at the other side; the depressed and raised portions strongly tending to assume the flat condition of the body thus to strongly hold the biting edges in strong biting engagement with said parts should the latter move apart; the inclination of the tooth relative to its width between said engagement edges, and the limit of elasticity of the ring body being such that the change of the ring body at said raised and depressed portions will be within the limits of the elasticity of the body; the distance between the top and bottom planes of said teeth when flattened, being greater than the normal thickness of the ring body, thereby providing space in which said raised and depressed portions may be freely raised and depressed respectively.

ADOLF THODE.